July 15, 1941.   W. B. MARTIN   2,249,153
TESTING DEVICE
Filed May 2, 1939   2 Sheets-Sheet 1
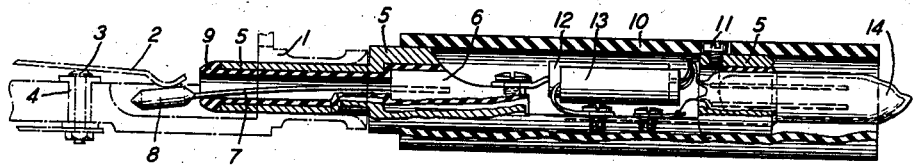
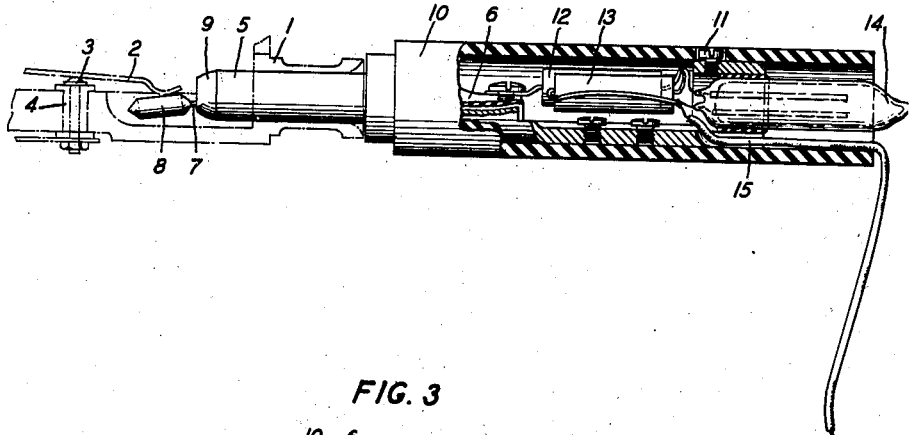
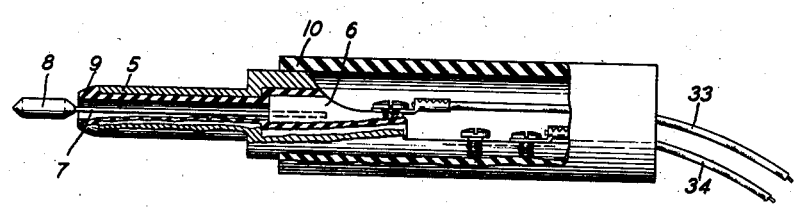
INVENTOR
W. B. MARTIN
BY
William R. Ballard
ATTORNEY Patented July 15, 1941

2,249,153

UNITED STATES PATENT OFFICE 2,249,153

TESTING DEVICE

Wade B. Martin, Westwood, N. J., assignor to American Telephone and Telegraph Company, a corporation of New York Application May 2, 1939, Serial No. 271,402

3 Claims. (Cl. 178—69)

This invention relates to testing devices and particularly to means for testing communication circuits.

It is an object of the invention to provide a low cost device of extreme flexibility which will give an instantaneous and positive indication of a condition to be detected in a communication circuit. A further object is to provide such a means in a form which will cause no disturbance in the circuits to which it is at any time connected and which will not interfere with normal service over such circuits.

Accordingly, a testing circuit of high impedance is provided including an indicating device of such high impedance and which requires for its operation so little current that its connection to a circuit will not interfere with normal operation. In practice this may take the form of a neon lamp circuit so proportioned that the lamp will flash at a given critical voltage.

A feature of the invention is a switchboard plug for cooperation with the spring jacks of a communication circuit switchboard, which plug is so constructed and arranged that upon insertion into a spring jack it will make electrical connections with the various elements of the jack without operating such elements in the normal manner. Where a spring jack is arranged to break the continuity of a circuit by lifting a spring out of contact with another upon the insertion of a plug, the insertion of the plug described herein will fail to cause such an operation. In the form shown a feature of this invention is a plug provided with a flexible tip element which has a considerable range of movement and sufficient spring tension to make a firm contact with the cooperating spring of a jack but insufficient tension to overcome the normal tension of such jack spring.

Another feature of the invention is a plug structure carrying certain circuit elements and indicating means whereby a portable testing device of small dimensions is provided. Such a device may be inserted in a spring jack of a circuit suspected of operating in an unstandard manner and, without causing any electrical disturbance, act as a detector of unstandard conditions.

By using a plurality of such plugs each inserted into the jack leading to a branch of a single communication circuit, the offending branch may be quickly identified.

Figure 4:
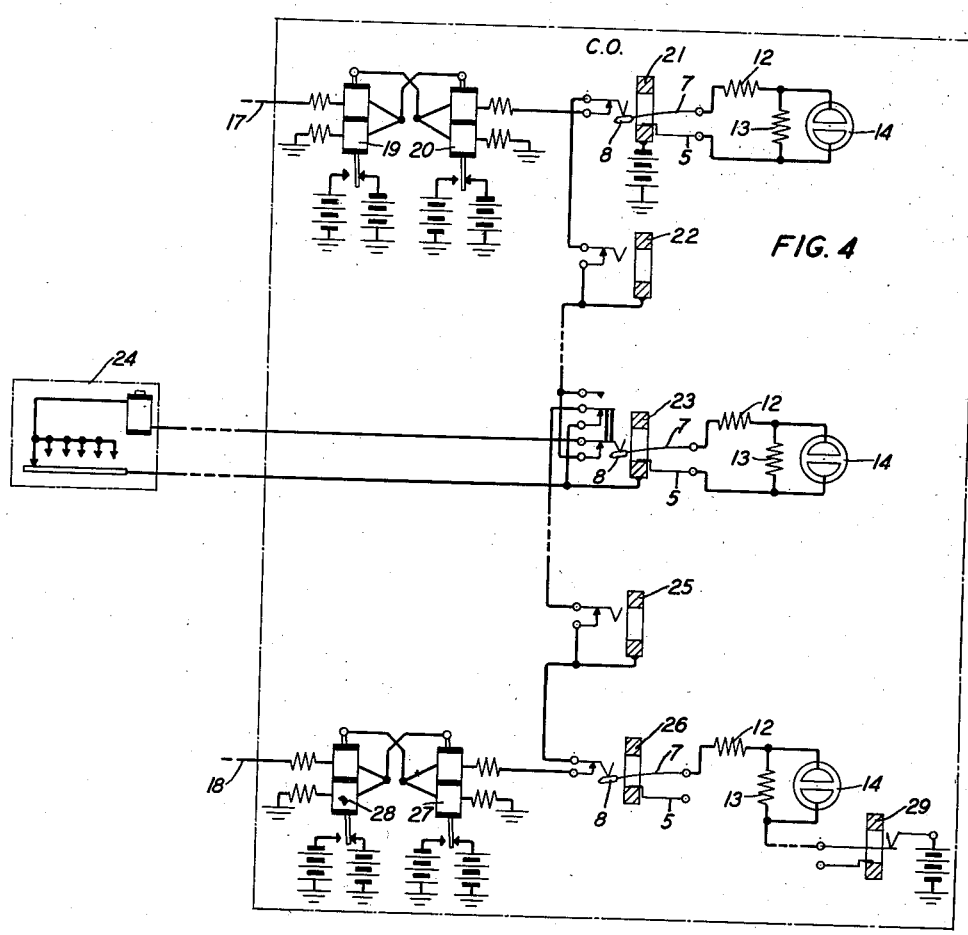
Figure 5:
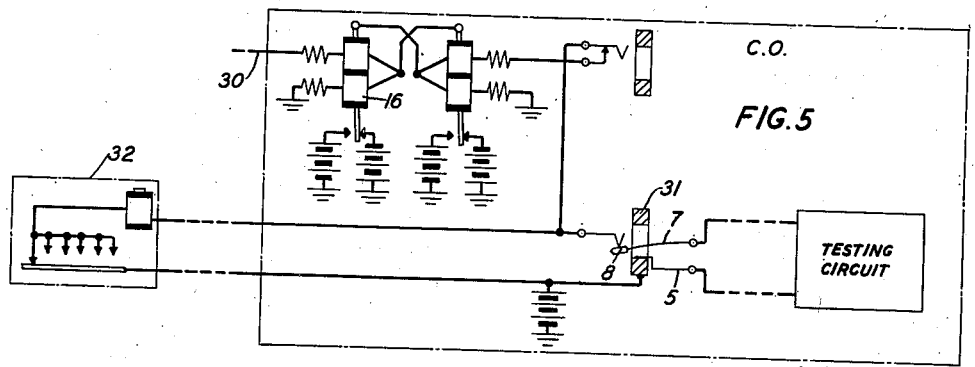

The drawings consist of two sheets, the first containing Figs. 1, 2 and 3, each being a view of the plug partly in section. In Figs. 1 and 2 the plug is shown as inserted in a spring jack, with its tip flexed, while in Fig. 3 the plug alone is shown and the tip is shown in its normal position. Fig. 4 shows the plug when used as a self-contained testing device and when used as part of a testing device when connected to the remainder of the testing circuit by a conductor leading from the circuit contained within the plug shell. In this figure three such plugs are shown in association with a communication circuit, the whole forming a circuit diagram. Fig. 5 is a circuit diagram illustrating the invention and the manner of its use when the whole of the testing circuit is external to the plug, that is, when the plug does not form a self-contained testing device.

In Fig. 1 a spring jack 1 is shown in sectional outline. A jack spring 2 is shown still in connection with a contact 3 insulated from the body of the jack 1 by an insulating bushing 4. This figure shows how the plug may be fully inserted in a spring jack without disturbing the mechanical positions of any of the jack springs and therefore without disturbing the normal electrical circuit through the jack springs.

The plug consists of a sleeve 5 of conducting material and a tip connection 6 of the same character. A steel spring wire 7 inserted at one end in the tip connection carries a tip piece 8 at its other end. The inner surface of the sleeve 5 carries an insulating bushing 9. Since the inner diameter of the sleeve 5 and the insulating bushing 9 is of the order of several times the diameter of the steel spring wire 7 the latter has a considerable range of movement. In fact, this range may be stated to be comparable to the outside diameter of the sleeve as is clearly indicated in the drawing.

An insulating cylinder or shell 10 is held to the sleeve 5 and is maintained in position by a screw 11, and forms a means for handling the plug without making contact with any of its conducting elements and a protective housing for the apparatus forming the circuit associated therewith.

A pair of resistance elements 12 and 13 and a glow lamp 14 are shown mounted within the shell 10 and certain connecting wires are shown though no attempt has been made to show the entire circuit arrangement.

The added conductor is not connected to sleeve 5. The lamp resistance connection to the sleeve in Fig. 1 is removed and is connected to conductor 15.

Fig. 3 is a circuit arrangement which illustrates a line 17 entering a central office generally shown by the broken line rectangle and leaving the central office over the conductor 18. The circuit may be traced from the line 17.

Fig. 2 shows another view of the plug only partly in section. This figure illustrates the arrangement when a connection from the junction of resistance 13 and neon lamp 14 instead of being made to the sleeve 5 is made to a conductor 15, which is then connected to some other point as the tip of another plug as illustrated in Fig. 4, in association with jack 26.

Fig. 3 is another view of the plug. In this view the plug is not inserted in a spring jack and so the tip 8 and spring 7 are shown in their normal positions. Also in this view the plug is shown with two conductors 33 and 34 connected to the tip and sleeve respectively for connection to a testing circuit entirely external to the plug as shown also in Fig. 5.

Fig. 4 is a circuit diagram illustrating a line 17 entering a central office generally shown by the broken line rectangle and leaving the central office over conductor 18. The circuit may be traced from the line 17, through the repeater consisting of the two polarized relays 19 and 20, the contacts of spring jack 21, the contacts of spring jack 22, the contacts of spring jack 23 over a local loop to teletypewriter station 24, the contacts of spring jack 23, the contacts of spring jack 25, the contacts of spring jack 26, the repeater consisting of the two polarized relays 27 and 28 to the line 18. A self-contained testing device as in Fig. 1 is plugged into jack 21 and jack 23 and another of the variety of Fig. 2 is plugged into the jack 26 with a connection made over conductor 15 to battery on the tip of jack 29. It will be noted in each case that the steel spring 7 is bent so that the tip piece 8 makes contact with the tip spring of the jack without lifting such tip spring off its contact so that, therefore, the mechanical positions of the jack springs have not been disturbed.

In the case of jack 21 the electrical connections form a high impedance bridge from the line to battery comprising a connection from the line, the tip spring of jack 21, the tip piece 8 of the test plug, the spring 7, the resistance 12 and then in parallel with each other, the resistance 13 and the glow lamp 14 to the sleeve 5 of the plug, the sleeve of the jack 21 to battery. Since the impedance of this circuit is very high the signals over the line will not be disturbed.

By way of example, the various batteries may be 130 volts plus or minus, the resistance 12 may be 1,000,000 ohms (1 megohm), resistance 13 may be 750,000 ohms and the lamp 14 may be a switchboard type glow lamp. With these values the lamp will not flash when the terminal voltage is as low as 130 volts but will begin glowing at about 160 volts and will reach full brilliance at 260 volts at which the current drain is only two-tenths of a milliampere. These values may be modified over a wide range in accordance with the character of the tests to be made.

In the present instance the relays in Fig. 4 are all shown in their marking contacts and it is assumed that the lines 17 and 18 and the loop to station 24 are in a closed or marking condition. Under these conditions the voltage across the tip 8 and sleeve 5 of the plug inserted in jack 21 is very low depending on the drop from the tip of jack 21 to the marking contact of relay 19. The lamp 14 will not glow under these conditions. Should the line 17, however, go to spacing, as when the line is opened, then relay 19 will go to spacing and the lamp 14 and its potentiometer circuit will be subjected to something approaching 260 volts, the addition of the plus battery on the spring contact of relay 19 and the minus battery on the sleeve of jack 21. Lamp 14 will glow under these conditions and thus indicate an open condition in line 17. Open conditions of extremely short duration, known as "hits" may be detected with this testing device. Should the line be opened in the other direction, say at jack 22 or in the station 23, the lamp 14 will not respond since the voltage across the jack 21 then becomes zero, there being no drop to the tongue of relay 19. The testing device in jack 21, therefore, is a faithful indicator of the condition of line 17.

Likewise, the testing device in jack 26 is a faithful indicator of the condition of line 18 though the potentials are reversed at this point. This also illustrates the arrangement when the sleeve of the jack has no battery connection. In this case the arrangement of Fig. 2 is used and a separate wire 15 is connected to a battery connection through jack 29.

In the case of loop jack 23 a self-contained testing device as in Fig. 1 is used and the testing circuit is connected to the loop conductors. Thus when the circuit through station 24 is opened, the lamp 14 will glow and only then.

With the three testing devices in the three jacks 21, 23 and 26 an observer will quickly observe which branch of the line or the loop to station 24 is open or being opened or closed. The testing devices inserted in the jacks do not mechanically disturb the contact arrangements or electrically disturb the circuit arrangements.

In Fig. 5 a line is shown entering a central office and terminating in a battery connection to the sleeve of loop jack 31. The loop jack 31 gives access to local station 32 and the testing device inserted therein will give a faithful indication of the condition of the loop and station 32 in the same manner as the testing device inserted in jack 23. This illustrates the use of the plug in a simple jack such as jack 31 where there are no auxiliary contacts and here the potentiometer circuit may be connected to an ordinary plug since movement of the jack springs need not be avoided, but the circuit arrangement is the same. As actually illustrated the plug of Fig. 3 is shown with a testing circuit which may be separately mounted at a distance as indicated by the broken lines between such testing circuit and the plug itself. Thus if the loop or station 32 goes to spacing or becomes opened the full potential of the battery connected to the sleeve of jack 31 is added to the potential on the marking contact of relay 16 to cause lamp 14 to glow.

What is claimed is:

1. A test plug for communication switchboards comprising a conducting sleeve member, an insulating shell surrounding a portion of said sleeve member, a gaseous conduction lamp mounted within said sleeve member, a flexible conducting tip member insulatingly supported by said sleeve member, and impedance elements connecting said lamp to at least one of said conducting members.

2. A plug for insertion into a spring jack comprising a cylindrical shell of conducting material and a concentrically arranged steel spring wire carrying at its outer extremity and beyond the end of said cylindrical shell a contact member of conducting material, the inner diameter of said cylindrical shell being of the order of several times the diameter of said steel spring wire.

3. A plug for insertion into a spring jack comprising concentrically arranged tip and sleeve members insulated from each other, said tip member comprising a resiliently mounted contact piece having a range of movement comparable to the outside diameter of said sleeve member.

WADE B. MARTIN.